United States Patent
Mathew et al.

(10) Patent No.: US 11,236,243 B2
(45) Date of Patent: Feb. 1, 2022

(54) LOW MIGRATION ENERGY CURABLE INKS

(71) Applicant: SUN CHEMICAL CORPORATION, Parsippany, NJ (US)

(72) Inventors: Mathew C. Mathew, Cedar Grove, NJ (US); David Biro, Rockaway, NJ (US)

(73) Assignee: Sun Chemical Corporation, Parsippany, NJ (US)

(*) Notice: Subject to any disclaimer, the term of this patent is extended or adjusted under 35 U.S.C. 154(b) by 0 days.

(21) Appl. No.: 16/644,608

(22) PCT Filed: Sep. 10, 2018

(86) PCT No.: PCT/US2018/050145
§ 371 (c)(1),
(2) Date: Mar. 5, 2020

(87) PCT Pub. No.: WO2019/055327
PCT Pub. Date: Mar. 21, 2019

(65) Prior Publication Data
US 2021/0062020 A1 Mar. 4, 2021

Related U.S. Application Data

(60) Provisional application No. 62/558,909, filed on Sep. 15, 2017.

(51) Int. Cl.

| | |
|---|---|
| C08F 2/46 | (2006.01) |
| C08F 2/50 | (2006.01) |
| C08G 61/04 | (2006.01) |
| C09D 11/00 | (2014.01) |
| C09D 11/101 | (2014.01) |
| C08F 222/10 | (2006.01) |
| B41J 11/00 | (2006.01) |
| C08F 220/18 | (2006.01) |
| C09D 11/037 | (2014.01) |
| C09D 11/106 | (2014.01) |
| C09K 11/00 | (2006.01) |

(52) U.S. Cl.
CPC .......... *C09D 11/101* (2013.01); *B41J 11/002* (2013.01); *C08F 2/50* (2013.01); *C08F 220/18* (2013.01); *C08F 222/102* (2020.02); *C08F 222/103* (2020.02); *C09D 11/037* (2013.01); *C09D 11/106* (2013.01); *C09K 11/00* (2013.01)

(58) Field of Classification Search
CPC ........... C08F 222/102; C08F 222/18; C08F 222/103; C08F 2/50; C09D 11/101; C09D 11/037; C09D 11/106; C09D 4/00; B41J 11/002; C09K 11/00

USPC ....... 106/31.6; 522/6, 189, 184, 71, 1; 520/1
See application file for complete search history.

(56) References Cited

U.S. PATENT DOCUMENTS

| | | | |
|---|---|---|---|
| 8,940,813 B2 | 1/2015 | Araki et al. | |
| 9,006,484 B2 | 4/2015 | Shimada et al. | |
| 9,604,943 B2 | 3/2017 | Kostromine et al. | |
| 9,605,180 B2 | 3/2017 | Illsley et al. | |
| 2006/0216443 A1* | 9/2006 | Kinoshita | B41M 5/502 428/32.24 |
| 2008/0186341 A1 | 8/2008 | Hirato | |
| 2011/0077318 A1 | 3/2011 | Nakamura et al. | |
| 2014/0118451 A1 | 5/2014 | Nakane et al. | |
| 2015/0368491 A1 | 12/2015 | Araki | |
| 2018/0127606 A1* | 5/2018 | Illsley | C07C 229/30 |
| 2019/0111452 A1* | 4/2019 | Illsley | B41M 5/0023 |

FOREIGN PATENT DOCUMENTS

| | | | | |
|---|---|---|---|---|
| WO | WO-2013134110 A1 * | 9/2013 | .......... | C08K 5/3495 |
| WO | WO 2014/165323 A1 | 10/2014 | | |
| WO | WO 2016/007593 A1 | 1/2016 | | |
| WO | WO 2016/178989 A1 | 11/2016 | | |
| WO | WO 2016/186838 A1 | 11/2016 | | |
| WO | WO-2016186838 A1 * | 11/2016 | .......... | C09D 11/101 |
| WO | WO 2017/095786 A1 | 6/2017 | | |
| WO | WO-2017141046 A1 * | 8/2017 | .......... | C09D 11/101 |
| WO | WO 2017/160784 A1 | 9/2017 | | |
| WO | WO-2017160784 A1 * | 9/2017 | ............ | C09D 11/38 |
| WO | WO 2017/220291 A1 | 12/2017 | | |
| WO | WO-2017217187 A1 * | 12/2017 | .......... | B41M 7/0081 |
| WO | WO 2018/165068 A1 | 9/2018 | | |

OTHER PUBLICATIONS

Toeda, WO 2017217187 Machine Translation, Dec. 21, 2017 (Year: 2017).*
International Search Report issued in International Application No. PCT/US18/50145, dated Jan. 4, 2019.
Written Opinion of the International Searching Authority issued in International Application No. PCT/US18/50145, dated Jan. 4, 2019.
International Preliminary Report on Patentability (Chapter II of the Patent Cooperation Treaty) issued in International Application No. PCT/US18/50145, dated Aug. 29, 2019.
European Search Report issued in counterpart EP Application No. 18856453.8 dated Jun. 2, 2021.

* cited by examiner

*Primary Examiner* — Jessica Whiteley
(74) *Attorney, Agent, or Firm* — Marian E. Fundytus; Ostrolenk Faber LLP.

(57) ABSTRACT

The present invention provides energy curable ink and coating compositions that comprise polymerizable compounds, photoinitiators, and colorants. The polymerizable compounds comprise one or more polymerizable monomers and/or oligomers, wherein at least a portion is 3-methyl-1, 5-pentanediol diacrylate. The inks and coatings of the invention exhibit excellent print properties after UV-LED, standard UV mercury vapor lamp, and electron beam cure.

12 Claims, No Drawings

LOW MIGRATION ENERGY CURABLE INKS

CROSS REFERENCE TO RELATED APPLICATIONS

The present application is a § 371 National Phase application based on PCT/US2018/050145 filed Sep. 10, 2018, which claims the benefit of U.S. Provisional Application No. 62/558,909, filed Sep. 15, 2017 the subject matter of each of which is incorporated by reference in their entirety.

FIELD OF THE INVENTION

The present invention is related to energy curable ink and coating compositions that exhibit excellent print properties after various types of energy cure. For example, the inks and coatings exhibit excellent print properties after UV-LED CURE.

BACKGROUND

Energy curable inks and coatings are becoming more popular. There has been a push to reduce volatile content in inks and coatings, such as is generally associated with solvent-based inks. Water-based inks often do not have adequate resistance properties. Energy curing is faster and more efficient than conventional curing means, such as heat.

Energy curable inks and coatings are often used in the printing of food packaging, pharmaceutical packaging, personal care and household packaging, display boards in supermarkets, etc. In all of these applications, it is advantageous that the energy cured ink or coating contains minimal amounts of uncured material that could leach ("migrate") out of the ink/coating into the surrounding environment, thereby causing unwanted contamination of the packaged product. This is of particular concern for food packaging where any contamination of the packaged food from undesirable, migratable, ink components should be minimized.

Use of high amounts of monofunctional monomers is also a problem in applications that require cured inks and coatings having low migration of contaminants (see U.S. Pat. No. 9,605,180). There are often residual, uncured, monofunctional monomers present after an ink or coating is cured. These residual monomers can migrate, contaminating the product.

In recent years, UV LED (light emitting diode) chip technology has grown considerably, in power, and efficiency at wavelengths important for photo-polymerization of UV-sensitive inks, coatings, and adhesives. The emergence of high brightness UV LED chips has quickly enabled the development of a new class of LED UV lamp curing luminaire systems and architectures with radiant power and intensity that rival the output of traditional UV lamps, but with the unwanted side effects that have restricted the adoption of conventional UV technology. Side effects and drawbacks of conventional UV technology include generation of heat associated with UV lamps that can cause substrate distortion, the generation of ozone and the hazards associated with the disposal of UV mercury vapor lamps.

With the development of new classes of UV LED lamps, there is a shift in the market place to UV LED lamps, moving away from traditional mercury vapor lamps. With the adoption of the new technology, there is a need for UV LED optimized inks capable of faster reactions under the most powerful LED UV wavelengths, typically between 385 and 395 nm. However, most of the commercially available ink systems are not suitable with today's faster press speeds.

Most conventional UV ink systems will not cure when exposed to UV LED lamps. To cure under UV LED lamps, the inks must be optimized. This involves the proper selection of monomers, oligomers, photoinitiators, and additives. Most commercially available UV LED ink systems suffer from lack of cure at higher press speeds. Typically, commercially available white inks cannot be cured at high speeds when using UV LED light. The white pigment absorbs much of the energy, leaving little energy to facilitate photopolymerization.

U.S. Pat. No. 8,940,813 discloses energy curable inks comprising N-vinyl compounds, acrylamides, and acrylates. U.S. Pat. No. 9,006,484 discloses a polymer comprising bis(diphenylphosphine)binaphthyl groups that can be used as a catalyst in energy curing compositions. U.S. Pat. No. 9,604,943 describes coating compositions comprising a UV absorber that comprises urethane acrylate, a diol di (meth) acrylate, and large amounts of organic solvents. US 2011/0077318 describes unpigmented antireflective coatings for electronic device display panels; the coatings must have a fine uneven structure. US 2015/0368491 describes inkjet compositions comprising a maleimide-styrene copolymer having an ammonium salt structure, an N-vinyl compound, and a photoinitiator.

Thus, there remains a need to develop inks that are capable of being cured in a variety of conditions, such as UV, UV-LED, electron beam, and high speed printing systems. An ink or coating that is suitable for any type of energy curing would be advantageous.

SUMMARY OF THE INVENTION

The present invention provides energy curable inks and coatings that exhibit good cure, printability, low migration, isopropanol rub resistance, and adhesion to flexible substrates, such as films used for food packaging and labeling of commercial articles.

In a particular aspect, the present invention provides an energy curable ink or coating composition, comprising:
 a) a polymerizable compound, wherein the polymerizable compound comprises:
  i. one or more polymerizable ethylenically unsaturated monomers and/or oligomers;
  ii. wherein 2 wt % to 40 wt % is 3-methyl-1,5-pentanediol diacrylate, based on the total weight of the polymerizable monomers and/or oligomers;
 b) one or more photoinitiators; and
 c) one or more colorants;
wherein the ink or coating composition comprises less than 2 wt % organic solvent, based on the total weight of the ink or coating composition.

The present invention also provides a method of printing an article by applying an energy curable ink or coating composition of the invention on a substrate, and curing the ink or coating composition on the substrate.

The present invention also provides printed articles comprising the energy curable inks and coatings of the invention.

These, and other objects, advantages, and features of the invention will become apparent to those persons skilled in the art upon reading the details of the methods and formulations described more fully below.

DETAILED DESCRIPTION OF THE INVENTION

It is to be understood that the foregoing general description and the following detailed description are exemplary and explanatory only, and are not restrictive of any subject matter claimed.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

The present invention provides energy curable inks and coatings having a range of improved properties. The inks and coatings of the invention are formulated to be curable using UV LED, even at high printing speeds.

The inks and coatings of the invention are suitable for any type of printing. For example, the inks and coatings of the invention are suitable for flexographic, lithographic, gravure, digital, inkjet, offset, screen, or letterpress printing, or the like. Preferred is flexographic printing.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, the term "photopolymerizable compound" refers to the mixture of all of the ethylenically unsaturated monomers and/or oligomers used in the ink or coating composition.

As used herein, the terms "(meth)acrylate" or "(meth) acrylic acid" include both acrylate and methacrylate compounds, and both acrylic acid and methacrylic acid.

As used herein, "monofunctional" means having one functional group.

As used herein, "multifunctional" means having two or more functional groups. A multifunctional monomer, for e.g., can be a di-functional, tri-functional, tetra-functional or have a higher number of functional groups. The two or more functional groups can be the same or different.

As used herein, the terms "monomer," "monomers," and "monomers and/or oligomers" are intended to include both monomers and oligomers, or mixtures thereof.

As used herein, the terms "inks and coatings," "inks," "compositions," "ink and coating compositions" and the like are used interchangeably.

As used herein, "energy-curing" refers to the cure achieved under exposure to various electromagnetic radiation sources producing an actinic effect. Such sources include but are not limited to, electron-beam, UV-light, visible-light, IR, or microwave. Where the compositions are cured under the action of UV light, then non-limiting UV sources such as the following can be used: low pressure mercury bulbs, medium pressure mercury bulbs, a xenon bulb, excimer lamps, a carbon arc lamp, a metal halide bulb, a UV-LED lamp or sunlight. It should be appreciated by those skilled in the art that any UV light source, or other source of actinic radiation, may be used to cure compositions prepared according to the current invention.

As used herein, "low migration" refers to the level of contamination of any packaged produce or product being less than 50 parts per billion (ppb) of any particular uncured monomer that may leach out of the ink or coating once it is cured on the substrate. 'Low migration' further means that contamination by photoinitiator residues and decomposition products should also be less than 50 ppb, or less than the specific migration limit (SML) existing for any specific photoinitiator. The methods of the current invention lend themselves to applications where higher conversion of monomer via energy curing, and reduced amounts of photodecomposition products, is preferable. Such applications include the printing of food packaging, pharmaceutical packaging, personal care and household packaging, display boards in supermarkets, etc. In all these applications it is advantageous that the energy-cured ink, or coating, contains minimal amounts of uncured material and photodecomposition products that could leach ('migrate') out of the ink into the surrounding environment thereby causing unwanted contamination. This is of particular concern for food packaging where any contamination of the packaged food from undesirable, migratable, ink components should be minimized. Therefore, any means to increase the conversion of such low molecular weight, low functionality monomers, and decrease the amount of photodecomposition products, during energy curing would be advantageous for the aforementioned sensitive printing applications. This is achieved by the compositions of the present invention, and the methods of printing energy curable ink and coating compositions according to the current invention.

As used herein, the term "sensitizer" means an agent or compound that is excited by active energy rays and interacts (for example, performs energy transfer or electron transfer) with other substances (for example a radical generator), thereby promoting the generation of a useful species, such as a radical.

As used herein, the term "article" or "articles" means a substrate or product of manufacture. Examples of articles include, but are not limited to: substrates such as paper, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

Throughout this disclosure, all parts and percentages are by weight (wt % or mass % based on the total weight) and all temperatures are in ° C. unless otherwise indicated.

Energy Curable Ink and Coating Compositions

The energy curable ink and coating compositions of the present invention comprise a photopolymerizable compound, which comprises one or more ethylenically unsaturated monomers and/or oligomers. As used herein, the term "photopolymerizable compound" refers to the mixture of all of the ethylenically unsaturated monomers and/or oligomers in the ink or coating composition. The ink and coating compositions of the invention typically comprise about 25 wt % to about 80 wt % photopolymerizable compound, based on the total weight of the ink or coating composition. For example, the photopolymerizable compound may be present in an amount of about 25 wt % to about 75 wt %, based on the total weight of the ink or coating composition; or about 25 wt % to about 70 wt %; or about 25 wt % to about 65 wt %; or about 25 wt % to about 60 wt %; or about 25 wt % to about 55 wt %; or about 25 wt % to about 50 wt %; or about 25 wt % to about 45 wt %; or about 25 wt % to about 40 wt %; or about 25 wt % to about 35 wt %; or about 25 wt % to about 30 wt %; or about 30 wt % to about 80 wt %; or about 30 wt % to about 75 wt %; or about 30 wt % to about 70 wt %; or about 30 wt % to about 65 wt %; or about 30 wt % to about 60 wt %; or about 30 wt % to about 55 wt %; or about 30 wt % to about 50 wt %; or about 30 wt % to about 45 wt %; or about 30 wt % to about 40 wt %; or about 30 wt % to about 35 wt %; or about 35 wt % to about 80 wt %; or about 35 wt % to about 75 wt %; or about 35 wt % to about 70 wt %; or about 35 wt % to about 65 wt %; or about 35 wt % to about 60 wt %; or about 35 wt % to about 55 wt %; or about 35 wt % to about 50 wt %; or about 35 wt % to about 45 wt %; or about 35 wt % to about 40 wt %; or about 40 wt % to about 80 wt %; or about 40 wt % to about 75 wt %; or about 40 wt % to about 70 wt %; or about 40 wt % to about 65 wt %; or about 40 wt % to about 60 wt %; or about 40 wt % to about 55 wt %; or about 40 wt % to about 50 wt %; or about 40 wt % to about 45 wt %; or about 45 wt % to about 80 wt %; or about 45 wt % to about 75 wt %; or about 45 wt % to about 70 wt %; or about 45 wt % to about 65 wt %; or about 45 wt % to about 60 wt %; or about 45 wt % to about 55 wt %; or about 45 wt % to about 50 wt %; or about 50 wt % to about 80 wt % or about 50 wt % to about 75 wt %; or about 50 wt % to about 70 wt %; or about 50 wt % to about 65 wt %; or about 50 wt % to about 60 wt %; or about 50 wt % to about 55 wt %; or about 55 wt % to about 80 wt %; or about 55 wt % to about 75 wt %; or about 55 wt % to about 70 wt %; or about 55 wt % to about 65 wt %; or about 55 wt % to about 60 wt %; or about 60 wt % to about 80 wt %; or about 60 wt % to about 75 wt %; or about 60 wt % to about 70 wt %; or about 60 wt % to about 65 wt %; or about 65 wt % to about 80 wt %; or about 65 wt % to about 75 wt %; or about 60 wt % to about 70 wt %; or about 70 wt % to about 80 wt %; or about 70 wt % to about 75 wt %; or about 75 wt % to about 80 wt %.

Compositions according to the present invention may comprise any amount of any blend of free radically polymerizable monomers and oligomers, as long as one of the components is 3-methyl-1,5-pentanediol diacrylate.

Examples of suitable monofunctional ethylenically unsaturated monomers include, but are not limited to, the following: isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acrylate; stearyl acrylate; iso-stearyl acrylate; behenyl acrylate; tetrahydrofurfuryl acrylate; 4-t-butyl cyclohexyl acrylate; 3,3,5-trimethyl-cyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2-(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethyleneglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl-1,2-(acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxybutyl acrylate; combinations thereof, and the like. As used herein, the term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts.

Examples of suitable multifunctional ethylenically unsaturated monomers include but are not limited to the following: 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3-methyl-1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10-decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxyethyl) isocyanurate triacrylate; F-caprolactone modified tris(2-hydroxyethyl) isocyanurate triacrylate; melamine acrylate oligomer; pentaerythritol tetraacrylate;

ethoxylated pentaerythritol tetraacrylate; di-trimethylolpropane tetra acrylate; dipentaerythritol pentaacrylate; dipentaerythritol hexaaacrylate; ethoxylated dipentaerythritol hexaacrylate; combinations thereof, and the like. The term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts.

Examples of monomers comprising free-radically polymerizable groups other than acrylate include N-vinyl amides. Suitable additional free-radically polymerizable monomers include, but are not limited to N-vinylcaprolactam (NVC); N-vinyl pyrollidone (NVP); diacetone acrylamide; N-vinyl oxazolidinone; or N-vinyl methoxazolidinone; N-vinyl carbazole; N-acryloxyoxyethylcyclohexanedicarboximide; N-vinyl imidazole; N-vinyl-N-methylacetamide (VIMA); or acryloyl morpholine (ACMO). Vinyl ethers such as 2-(2-vinyloxyethoxy)ethyl(meth)acrylate (VEEA, VEEM); diethylene glycol divinyl ether (DVE2); triethylene glycol divinyl ether (DVE3); ethyl vinyl ether; n-butyl vinyl ether; iso-butyl vinyl ether; tert-butyl vinyl ether; cyclohexyl vinyl ether (CHVE); 2-ethylhexyl vinyl ether (EHVE); dodecyl vinyl ether (DDVE); octadecyl vinyl ether (ODVE); 1-2-butanediol divinyl ether (BDDVE); 1-4,cyclohexanedimethanol divinylether (CHDM-di); hydroxybutyl vinylether (HBVE); 1-4-cyclohexanedimethanolmono vinylether (CHDM-mono); 1,2,4-trivinylcyclohexane (TVCH); vinylphosphonic acid dimethylester (VPA); or vinylphosphonic acid dimethyl ester (VPADME).

Advantageously, the energy curable ink and coating compositions of the present invention comprise 3-methyl-1,5-pentanediol diacrylate as one of the photopolymerizable components. The energy curable ink and coating compositions of the present invention typically comprise about 2 wt % to about 40 wt % 3-methyl-1,5-pentanediol diacrylate, based on the total weight of the photopolymerizable monomers and/or oligomers. Preferably, the energy curable ink and coating compositions of the present invention comprise about 5 wt % to about 40 wt % 3-methyl-1,5-pentanediol diacrylate, based on the total weight of the photopolymerizable monomers and/or oligomers. For example, the ink and coating compositions of the invention may comprise about 2 wt % to about 35 wt % 3-methyl-1,5-pentanediol diacrylate, based on the total weight of the photopolymerizable monomers and/or oligomers; or about 2 wt % to about 30 wt %; or about 2 wt % to about 25 wt %; or about 2 wt % to about 20 wt %; or about 2 wt % to about 15 wt %; or about 2 wt % to about 10 wt %; or about 2 wt % to about 5 wt %; or about 5 wt % to about 40 wt %; or about 5 wt % to about 35 wt %; or about 5 wt % to about 30 wt %; or about 5 wt % to about 25 wt %; or about 5 wt % to about 20 wt %; or about 5 wt % to about 15 wt %; or about 5 wt % to about 10 wt %; or about 10 wt % to about 40 wt %; or about 10 wt % to about 35 wt %; or about 10 wt % to about 30 wt %; or about 10 wt % to about 25 wt %; or about 10 wt % to about 20 wt %; or about 10 wt % to about 15 wt %; or about 15 wt % to about 40 wt %; or about 15 wt % to about 35 wt %; or about 15 wt % to about 30 wt %; or about 15 wt % to about 25 wt %; or about 15 wt % to about 20 wt %; or about 20 wt % to about 40 wt %; or about 20 wt % to about 35 wt %; or about 20 wt % to about 30 wt %; or about 20 wt % to about 25 wt %; or about 25 wt % to about 40 wt %; or about 25 wt % to about 35 wt %; or about 25 wt % to about 30 wt %; or about 30 wt % to about 40 wt %; or about 30 wt % to about 35 wt %; or about 35 wt % to about 40 wt %.

The energy curable ink and coating compositions comprise one or more photoinitiators. The type of photoinitiator used is not limited. Preferably, the compositions of the invention comprise one or more photoinitiators selected from the group consisting of alkyl amino acetophenone, polymeric thioxanthone, phosphine oxide, and combinations thereof.

There is no restriction on the type, blend or concentration of photoinitiator used and can include any suitable type of photoinitiators, such as, but not limited to: α-hydroxyketones, acyl phosphine oxides, α-aminoketones, thioxanthones, benzophenones, phenylglyoxylates, oxime esters, and combinations thereof.

Suitable α-hydroxyketones include, but are not limited to: 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis[4-(2-hydroxy-2-methylpropionyl)phenyl]methane; 2-hydroxy-1-[1-[4-(2-hydroxy-2-methylpropanoyl)phenyl]-1,3,3-trimethylindan-5-yl]-2-methylpropan-1-one; 2-hydroxy-1-[4-[4-(2-hydroxy-2-methylpropanoyl)phenoxy]phenyl]-2-methylpropan-1-one; and combinations thereof.

Suitable acylphosphine oxides include, but are not limited to: 2,4,6-trimethylbenzoyl-diphenylphosphine oxide; ethyl-(2,4,6-trimethylbenzoyl)phenyl phosphinate; bis-(2,4,6-trimethylbenzoyl)-phenylphosphine oxide; and combinations thereof.

Suitable α-aminoketones include, but are not limited to: 2-methyl-1-[4-(methylthio)phenyl]-2-morpholinopropan-1-one; 2-benzyl-2-dimethylamino-1-(4-morpholinophenyl)-butan-1-one; 2-dimethylamino-2-(4-methyl-benzyl)-1-(4-morpholin-4-yl-phenyl)-butan-1-one; and combinations thereof.

Suitable thioxanthones include, but are not limited to: 2-4-diethylthioxanthone, isopropylthioxanthone, 2-chlorothioxanthone, and 1-chloro-4-propoxythioxanthone; and combinations thereof. In some embodiments, the thioxanthones act as a sensitizer.

Suitable benzophenones include, but are not limited to: benzophenone, 4-phenylbenzophenone, and 4-methylbenzophenone; methyl-2-benzoylbenzoate; 4-benzoyl-4-methyl-diphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenone laurate; 1-[-4-[benzoylphenylsulpho]phenyl]-2-methyl-2-(4-methylphenylsulphonyl)propan-1-one; and combinations thereof.

Suitable phenylglyoxylates include, but are not limited to: phenyl glyoxylic acid methyl ester; oxy-phenyl-acetic acid 2-[hydroxyl-ethoxy]-ethyl ester; oxy-phenyl-acetic acid 2-[2-oxo-2-phenyl-acetoxy-ethoxy]-ethyl ester; and combinations thereof.

Suitable oxime esters include, but are not limited to: 1-phenyl-1,2-propanedione-2-(O-ethoxycarbonyl)oxime; [1-(4-phenylsulfanylbenzoyl)heptylideneamino]benzoate; [1-[9-ethyl-6-(2-methylbenzoyl)carbazol-3-yl]-ethylideneamino]acetate; and combinations thereof.

Examples of other suitable photoinitiators include diethoxy acetophenone; benzil; benzil dimethyl ketal; titanocen radical initiators such as titanium-bis(η 5-2,4- cyclopentadien-1-yl)-bis-[2,6-difluoro-3-(1H-pyrrol-1-yl) phenyl]; 9-fluorenone; camphorquinone; 2-ethyl anthraquinone; and the like.

An amine synergist may also optionally be included in the formulation. Suitable examples include, but are not limited to: aromatic amines, such as 2-(dimethylamino)ethylbenzoate; N-phenyl glycine; benzoic acid, 4-(dimethylamino)-, 1,1'-[(methylimino)di-2,1-ethanediyl] ester; and simple alkyl esters of 4-(N,N-dimethylamino)benzoic acid and other positional isomers of N,N-dimethylamino)benzoic acid esters, with ethyl, amyl, 2-butoxyethyl and 2-ethylhexyl esters being particularly preferred; aliphatic amines, such as such as N-methyldiethanolamine, triethanolamine and triisopropanolamine; aminoacrylates and amine modified polyether acrylates, such as EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER P077F, all available from BASF; AGISYN 701, AGISYN 702, AGISYN 703, NeoRad P-81 and NeoRad P-85 all available from DSM-AGI.

Polymeric photoinitiators and sensitizers are also suitable, including, for example, polymeric aminobenzoates (GENOPOL AB-1 or AB-2 from RAHN; Omnipol ASA from IGM or Speedcure 7040 from Lambson), polymeric benzophenone derivatives (GENOPOL BP-1 or BP-2 from RAHN; Omnipol BP, Omnipol BP2702 or Omnipol 682 from IGM or Speedcure 7005 from Lambson); polymeric thioxanthone derivatives (GENOPOL TX-1 or TX-2 from RAHN, Omnipol TX from IGM or Speedcure 7010 from Lambson); polymeric aminoalkylphenones such as Omnipol 910 from IGM; polymeric benzoyl formate esters such as Omnipol 2712 from IGM; and the polymeric sensitizer Omnipol SZ from IGM.

Typically, the energy curable ink and coating compositions comprise about 1 wt % to about 20 wt % photoinitiators, based on the total weight of the ink or coating composition. Preferably, the ink and coating compositions comprise about 2 wt % to about 15 wt % photoinitiators, based on the total weight of the ink or coating composition. For example, the photoinitiators may be present in an amount of about 1 wt % to about 15 wt %; or about 1 wt % to about 10 wt %; or about 1 wt % to about 5 wt %; or about 1 wt % to about 2 wt %; or about 2 wt % to about 20 wt %; or about 2 wt % to about 15 wt %; or about 2 wt % to about 10 wt %; or about 2 wt % to about 5 wt %; or about 5 wt % to about 20 wt %; or about 5 wt % to about 15 wt %; or about 5 wt % to about 10 wt %; or about 10 wt % to about 20 wt %; or about 10 wt % to about 15 wt %; or about 15 wt % to about 20 wt %.

The energy curable ink and coating compositions of the invention typically comprise one or more optical brightening agents (optical brighteners). Suitable optical brighteners include, but are not limited to: bis-benzoxazoles; coumarins; stilbenes, including triazine-stilbene, and biphenyl stilbenes; diazoles; triazoles; benzoxazolines; combinations thereof; and the like. Fluorescent brighteners are preferred. In some embodiments, optical brighteners act as a sensitizer.

When present, the ink and coating compositions of the invention typically comprise about 0.1 wt % to about 5 wt % optical brighteners, based on the total weight of the ink or coating composition. Preferably, optical brighteners are present in an amount of about 0.1 wt % to about 2 wt %.

The presence of oxygen can interfere with UV cure. Therefore, the ink and coating compositions of the invention typically comprise one or more oxygen inhibitors, such as thiols, amines, or ethers. Suitable oxygen inhibitors include, but are not limited to: aminated ethoxylated trimethylolpropane triacrylate; N-vinyl amides; combinations thereof; and the like.

When present, the ink and coating compositions of the invention typically comprise about 0.1 wt % to about 25 wt % oxygen inhibitors, based on the total weight of the ink or coating composition. Preferably, oxygen inhibitors are present in an amount of about 1 wt % to about 25 wt %, based on the total weight of the ink or coating composition. For example, the oxygen inhibitors may be present in an amount of about 0.1 wt % to about 20 wt %, based on the total weight of the ink or coating composition; or about 0.1 wt % to about 15 wt %; or about 0.1 wt % to about 10 wt %; or about 0.1 wt % to about 5 wt %; or about 0.1 wt % to about 1 wt %; or about 0.1 wt % to about 0.5 wt %; or about 0.5 wt % to about 25 wt %; or about 0.5 wt % to about 20 wt %; or about 0.5 wt % to about 15 wt %; or about 0.5 wt % to about 10 wt %; or about 0.5 wt % to about 5 wt %; or about 0.5 wt % to about 1 wt %; or about 1 wt % to about 25 wt %; or about 1 wt % to about 20 wt %; or about 1 wt % to about 15 wt %; or about 1 wt % to about 10 wt %; or about 1 wt % to about 5 wt %; or about 5 wt % to about 25 wt %; or about 5 wt % to about 20 wt %; or about 5 wt % to about 15 wt %; or about 5 wt % to about 10 wt %; or about 10 wt % to about 25 wt %; or about 10 wt % to about 20 wt %; or about 10 wt % to about 15 wt %; or about 15 wt % to about 25 wt %; or about 15 wt % to about 20 wt %; or about 20 wt % to about 25 wt %.

The ink and coating compositions of the invention comprise colorants. Suitable colorants include, but are not limited to, organic or inorganic pigments and dyes. The dyes include, but are not limited to, azo dyes, anthraquinone dyes, xanthene dyes, azine dyes, combinations thereof, and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

The colorants are typically provided as a colorant base, comprising pigment or dye, diluents, dispersants, and the like. The colorant is typically present in the colorant base in an amount of about 20 wt % to about 45 wt %, based on the total weight of the colorant base. For example, the colorant may be present in an amount of about 20 wt % to about 40 wt %, based on the total weight of the colorant base; or about 20 wt % to about 35 wt %; or about 20 wt % to about 30 wt %; or about 20 wt % to about 25 wt %; or about 25 wt % to about 45 wt %; or about 25 wt % to about 40 wt %; or about 25 wt % to about 35 wt %; or about 25 wt % to about 30 wt %; or about 30 wt % to about 45 wt %; or about 30 wt % to about 40 wt %; or about 30 wt % to about 35 wt %; or about 35 wt % to about 45 wt %; or about 35 wt % to about 40 wt %; or about 40 wt % to about 45 wt %. Typically, the ink and coating compositions comprise about 20 wt % to about 60 wt % colorant bases, based on the total weight of the ink or coating composition. For example, the colorant bases may be present in an amount of about 20 wt % to about 55 wt %, based on the total weight of the ink or coating composition; or about 20 wt % to about 50 wt %; or about 20 wt % to about 45 wt %; or about 20 wt % to about 40 wt %; or about 20 wt % to about 35 wt %; or about 20 wt % to about 30 wt %; or about 20 wt % to about 25 wt %; or about 25 wt % to about 60 wt %; or about 25 wt % to about 55 wt %; or about 25 wt % to about 50 wt %; or about 25 wt % to about 45 wt %; or about 25 wt % to about 40 wt %; or about 25 wt % to about 35 wt %; or about 25 wt % to about 30 wt %; or about 30 wt % to about 60 wt %; or about 30 wt % to about 55 wt %; or about 30 wt % to about 50 wt %; or about 30 wt % to about 45 wt %; or about 30 wt % to about 40 wt %; or about 30 wt % to about 35 wt %; or about 35 wt % to about 60 wt %; or about 35 wt % to about 55 wt %; or about 35 wt % to about 50 wt %; or about 35 wt % to about 45 wt %; or about 35 wt % to about 40 wt %; or about 40 wt % to about 60 wt %; or about 40 wt % to about 55 wt %; or about 40 wt % to about 50 wt %; or about 40 wt % to about 45 wt %; or about 45 wt % to about 60 wt %; or about 45 wt % to about 55 wt %; or about 45 wt % to about 50 wt %; or about 50 wt % to about 60 wt %; or about 50 wt % to about 55 wt %; or about 55 wt % to about 60 wt %.

The ink and coating compositions of the invention may further comprise one or more waxes. Suitable waxes include, but are not limited to, amide wax, erucamide wax, polypropylene wax, paraffin wax, polyethylene wax, Teflon, carnuba wax, combinations thereof, and the like. It is preferred that the wax be a blend of amide and erucamide waxes.

When present, the waxes are typically present in an amount of about 0.1 wt % to about 4 wt %, based on the total weight of the ink or coating composition. Preferably, the wax is present in an amount of about 0.1 wt % to about 2 wt %, based on the total weight of the ink or coating composition. For example, the wax may be present in an amount of about 0.1 wt % to about 3.5 wt %, based on the total weight of the ink or coating composition; or about 0.1 wt % to about 3 wt %; or about 0.1 wt % to about 2.5 wt %; or about 0.1 wt % to about 2 wt %; or about 0.1 wt % to about 1.5 wt %; or about 0.1 wt % to about 1 wt %; or about 0.1 wt % to about 0.5 wt %; or about 0.5 wt % to about 4 wt %; or about 0.5 wt % to about 3.5 wt %; or about 0.5 wt % to about 3 wt %; or about 0.5 wt % to about 2.5 wt %; or about 0.5 wt % to about 2 wt %; or about 0.5 wt % to about 1.5 wt %; or about 0.5 wt % to about 1 wt %; or about 1 wt % to about 4 wt %; or about 1 wt % to about 3.5 wt %; or about 1 wt % to about 3 wt %; or about 1 wt % to about 2.5 wt %; or about 1 wt % to about 2 wt %; or about 1 wt % to about 1.5 wt %; or about 1.5 wt % to about 4 wt %; or about 1.5 wt % to about 3.5 wt %; or about 1.5 wt % to about 3 wt %; or about 1.5 wt % to about 2.5 wt %; or about 1.5 wt % to about 2 wt %; or about 2 wt % to about 4 wt %; or about 2 wt % to about 3.5 wt %; or about 2 wt % to about 3 wt %; or about 2 wt % to about 2.5 wt %; or about 2.5 wt % to about 4 wt %; or about 2.5 wt % to about 3.5 wt %; or about 2.5 wt % to about 3 wt %; or about 3 wt % to about 4 wt %; or about 3 wt % to about 3.5 wt %; or about 3.5 wt % to about 4 wt %.

As with most ink and coating compositions, additives may be incorporated to enhance various properties. A partial list of such additives includes but is not limited to adhesion promoters, silicones, light stabilizers, de-gassing additives, waxes, ammonia, flow promoters, defoamers, antioxidants, stabilizers, surfactants, dispersants, plasticizers, rheological additives, waxes, silicones, etc. When present, these additives are typically used each independently in amounts of not more than 5 wt % each, based on the total weight of the ink or coating composition.

In some embodiments, the ink and coating compositions of the invention may comprise small amounts of organic solvents. Preferably, the ink and coating compositions comprise less than 2 wt % organic solvents, based on the total weight of the ink or coating composition. Most preferably, the ink and coating compositions contain no organic solvents.

The inks and coatings of the invention have several advantages over commercially available inks. For example, the inks can be cured at high press speeds (up to 759 feet/minute) using 395 nm UV-LED lamps. The inks and coatings of the invention have good chemical resistance (as indicated by isopropanol rubs), good tape adhesion to a variety of substrates (including flexible polymeric films), good opacity (white) and density (colors), good nail scratch resistance, and good printability (trapability).

Advantageously, although the inks were initially developed to be curable with UV-LED energy (about 385 to 395 nm), they also exhibit excellent print properties after standard UV cure (about 200 nm to 450 nm), and electron beam (EB) cure. Therefore the inks and coatings of the present invention are suitable for any type of energy curing used in commercial print systems.

EXAMPLES

The following examples illustrate specific aspects of the present invention, and are not intended to limit the scope thereof in any respect and should not be so construed.
Methods
Preparation of Ink or Coating
The materials were mixed with a high speed mixer.
Printing of Ink or Coating
Inks were printed as described below for each set of test results. The printability was assessed by measuring color density for Ex. 2 to 5 (colors), and opacity for Ex. 1 (white). The density of Ex. 2 to 5 inks (colors) was measured using a spectrophotometer. The opacity of Ex. 1 ink (white) was measured using a BNL opacity meter. A density of 1.0 for Yellow, 1.4 for Cyan, 1.5 for Magenta, and 1.7 for Black is considered acceptable, and an opacity of 50 for white ink is considered acceptable. Comparative inks were printed and measured in the same way.
Tape Adhesion
Adhesion of the cured ink or coating was tested using a fast peel test, using 3M film tape. The fast peel test was performed right after cure of the ink or coating on the substrate. The film tape was adhered to the printed cured ink sample on the substrate, and then removed by hand at a fast rate in one continuous motion. Adhesion is reported as percent of ink remaining, where 100% is best and 0% is worst. A rating of 100% means that no ink is removed by the tape, and a rating of 0% means that all of the ink was removed by the tape.

Solvent Rub Resistance

This test involved rubbing the surface of a cured ink or coating film with a cotton pad soaked with isopropyl alcohol (IPA) until failure or breakthrough of the film. The rubs were counted as double rub (one rub forward and one backward constitutes one double rub). A cotton swab was dipped into IPA and double rubs were performed on the surface of the substrate coated with the ink or coating until the ink or coating began to break. A minimum of 10 rubs was required to be considered to be an acceptable rub resistance.

Surface Cure (Nail Scratch Resistance)

To simulate the resistance of a printed carton or package to scratch/marring, which is an indication of cure. The substrate upon which the ink or coating had been applied was placed on a hard surface, with the ink side up. The printed surface was scratched in one continuous movement with the back of the fingernail. Scratch resistance was assessed as poor or excellent, based on the amount of ink removed.

Surface Cure (Specac)

Irradiated prints were tested for cure using a set-off cure test. A blank piece of paper was placed in contact with the sample print, and 12 metric tons of pressure was applied for 60 seconds. The blank paper was tested for ink transfer by measuring ΔE, wherein ΔE is the color difference of the blank paper before testing and after testing, measured with a spectrophotometer. When the ink is fully cured there is no substantial transfer of color to the blank substrate, but when the ink is not fully cured a significant amount of color is transferred.

Example 1. Flexographic White Ink

A flexographic white ink was prepared according to the formulation in Table 1.

TABLE 1

Flexographic white ink

| Material | Description | wt % |
|---|---|---|
| RCX 12-191 | Inhibitor | 0.5 |
| Byk 361N | Levelling Agent | 0.5 |
| Byk 9077 | Dispersant | 1.0 |
| SR399 | DPHA | 15.0 |
| SR-341 | 3-methyl-1,5-pentandediol diacrylate monomer | 2.0 |
| CN2303EU | Oligomer | 6.0 |
| Mix above materials well | | |
| Tioxide TR52 | White Pigment | 52.0 |
| Mix white pigment until pigment is well disperser | | |
| Omnirad 819 | Bis acyl phosphine Oxide Photoinitiator | 2.0 |
| Optiblanc PL | Optical brightener | 0.1 |
| Add above materials and mix until batch reaches 65° C. | | |
| methyl 1,5 pentane diol diacrylate | monomer | 13.9 |
| DPHA | monomer | 7.0 |
| Add above materials and mix well | | |
| Total | | 100.0 |

Example 1 white ink was tested and the results are described below.

Examples 2 to 9. Flexographic Process Inks

Flexographic process inks were prepared by mixing the technology varnish described in Table 2, with various process color pigment bases.

TABLE 2

Technology varnish

| Material | Description | wt % |
|---|---|---|
| RCX 12-191 | Inhibitor | 0.5 |
| SR-341 | Monomer | 14.0 |
| Eb. LEO 10552 Amine modified EOTMPTA | Monomer | 10.0 |
| Mix above materials well | | |
| Omnirad 819 | Photoinitiator | 4.9 |
| PL-369 | Alpha amino Ketone | 4.9 |
| Omnipol TX | Polymeric Isothioxanthone Photoinitiator | 7.8 |
| Optiblanc PL | Optical brightener | 0.2 |
| Mix above materials to 70° C. until dissolved | | |
| CN2303EU | Oligomer | 9.8 |
| DPHA | Monomer | 44.5 |
| Byk 361N | Levelling agent | 1.0 |
| Mix above materials to 70° C. until dissolved, then cool to 45° C. and add the following material | | |
| Cerasperse UV 691 | Wax | 2.4 |
| mix well | | |
| Total | | 100.0 |

Magenta base: 39% Rubine Red (R57.1) pigment, 26.5% amine modified pentaerythritol tetra-acrylate (PPTTA), 26.5% ethoxylated trimethylolpropane triacrylate (EOTMPTA) and 7% dispersant.

Cyan base: 46.7% Blue (B15.4) pigment, 22.8% PPTTA, 22.8% EOTMPTA and 6.7% dispersant.

Yellow base: 39.8% Yellow (Y14) pigment, 28.1% PPTTA, 28.1% EOTMPTA and 3% dispersant.

Resistant violet base: 17.8% Violet 23 pigment, 37% PPTTA, 30.1% EOTMPTA and 14.2% dispersant.

Black base: 28% Black (K7) pigment, 31.6% PPTTA, 12.2% EOTMPTA and 7.6% dispersant.

The formulations of inventive flexographic process inks Examples 2 to 5 are described in Tables 3 to 6, respectively. The materials were added and mixed well.

TABLE 3

Example 2 Magenta ink

| Material | wt % |
|---|---|
| Magenta Base | 46.0 |
| Technology Varnish | 54.0 |
| Total | 100.0 |

TABLE 4

Example 3 Cyan ink

| Material | wt % |
|---|---|
| Cyan Base | 40.0 |
| Technology Varnish | 60.0 |
| Total | 100.0 |

TABLE 5

Example 4 Yellow ink

| Material | wt % |
|---|---|
| Yellow Base | 50.2 |
| Technology Varnish | 49.8 |
| Total | 100.0 |

TABLE 6

Example 5 Black ink

| Material | wt % |
|---|---|
| Resistant Violet Base | 4.0 |
| Cyan Base | 3.0 |
| Black Base | 35.0 |
| Technology Varnish | 58.0 |
| Total | 100.0 |

Examples 6 to 9 are comparative inks, as follows:

Comparative Example 6: Max D UV LED Process Yellow—TPAFV2486494

Comparative Example 7: Max D UV LED Process Magenta—TPAFV4486495

Comparative Example 8: Max D UV LED Process Cyan—TPAFV5486496

Comparative Example 9: Max D UV LED Process Black—TPAFV9486497

Example 10. Properties of Flexographic Process Inks after UV-LED Cure

Using a Mark Andy label press equipped with 18 watts/cm² GEW UV LED lamps (Model: P5 performance 4 unit label press), inks were printed onto gloss coated paper at 750 feet/minute (3.81 m/sec).

Two print runs were done, one with Ex. 5 black ink, and one with Ex. 1 white ink. The results for inventive Examples are shown in Tables 7 and 8. A third print run was done using comparative Examples 6 to 9, and the results are shown in Table 9.

The properties of the inks were tested as described above.

TABLE 7

Properties of Ex. 2 to 4 and Ex. 5 (black ink)

| | Print Unit #1 Ex. 5 Black | Print Unit #2 Ex. 4 Yellow | Print Unit #3 Ex. 2 Magenta | Print Unit #4 Ex. 3 Cyan |
|---|---|---|---|---|
| Surface Cure (Nail Scratch) | Excellent | Excellent | Excellent | Excellent |
| Surface Cure (Specac) | Excellent | Excellent | Excellent | Excellent |
| IPA Rubs | 60+ | 35 | 100+ | 100+ |
| Tape adhesion (600 Tape) | 100% | 100% | 100% | 100% |
| Density | 1.36 | 1.2 | 1.36 | 1.67 |

TABLE 8

Properties of Ex. 2 to 4 and Ex. 1 (white ink)

| | Unit #1 Ex. 1 White | Unit #2 Ex. 4A Yellow | Unit #3 Ex. 2A Magenta | Unit #4 Ex. 3A Cyan |
|---|---|---|---|---|
| Surface Cure (Nail Scratch) | Excellent | Excellent | Excellent | Excellent |
| Surface Cure (Specac) | Excellent | Excellent | Excellent | Excellent |
| IPA Rubs | 100+ | 100+ | 100+ | 100+ |
| Tape adhesion (600 Tape) | 100% | 100% | 100% | 100% |
| Density | 70.2 (opacity) | 1.2 | 1.37 | 1.57 |

The results in Tables 7 and 8 show that the inventive inks, Ex. 1 to 5, exhibit excellent cure and adhesion, are solvent resistant, and print a tan acceptable density/opacity.

TABLE 9

Properties of comparative inks Ex. 6 to 9

| | Unit #1 Comp. Ex. 9 Black | Unit #2 Comp. Ex. 6 Yellow | Unit #3 Comp. Ex. 7 Magenta | Unit #4 Comp. Ex. 8 Cyan |
|---|---|---|---|---|
| Surface Cure (Nail Scratch) | Poor | Poor | Poor | Poor |
| Surface Cure (Specac) | Poor | Poor | Poor | Poor |
| IPA Rubs | 2 | 6 | 2 | 5 |
| Tape adhesion (600 Tape) | 90% | 90% | 90% | 90% |
| Density | 1.39 | 1.13 | 1.62 | 1.72 |

The results in Table 9 show that the properties of comparative inks Ex. 6 to 9 are inferior to the properties of inventive inks Ex. 1 to 5.

Example 11. Properties of Flexographic Process Inks after Cure with Medium Pressure Mercury Vapor Lamp Prints of process colors Ex. 2 to 5 were made on gloss coated paper using a 700 line 2.2 BCM anilox roller. White print Ex. 1 was made using 200 line 7.19 BCM anilox roller. These prints were cured using a medium pressure mercury vapor lamp at 300 feet/minute (1.52 m/sec) at a lamp setting of 400 Watts. Prints were tested for cure, tape adhesion, and density. The results are shown in Table 10.

TABLE 10

Properties of Ex. 1 to 5 after UV lamp cure

| | Ex. 1 White | Ex. 2 Magenta | Ex. 3 Cyan | Ex. 4 Yellow | Ex. 5 Black |
|---|---|---|---|---|---|
| Surface Cure (Nail Scratch) | Excellent | Excellent | Excellent | Excellent | Excellent |

TABLE 10-continued

| | Properties of Ex. 1 to 5 after UV lamp cure | | | | |
| --- | --- | --- | --- | --- | --- |
| | Ex. 1 White | Ex. 2 Magenta | Ex. 3 Cyan | Ex. 4 Yellow | Ex. 5 Black |
| Surface Cure (Specac) | Excellent | Excellent | Excellent | Excellent | Excellent |
| IPA Rubs | 80+ | 60+ | 60+ | 60+ | 50+ |
| Tape adhesion (600 Tape) | 100% | 100% | 100% | 100% | 100% |
| Density | 68 (opacity) | 1.35 | 1.48 | 1.05 | 1.42 |

The results in Table 10 show that the inventive inks Ex. 1 to 5 exhibit excellent properties after curing with a medium pressure mercury vapor lamp (i.e. standard UV lamp).

Example 12. Properties of Flexographic Process Inks after Electron Beam Cure

Prints of process colors Ex. 2 to 5 were made on gloss coated paper using a 700 line 2.2 BCM anilox roller. White print Ex. 1 was made using 200 line 7.19 BCM anilox roller. These prints were cured using a laboratory electron beam (EB) unit at 30 kGy, 100 kV with an oxygen level of 30 ppm (parts per million). Prints were tested for cure, tape adhesion, and density. The results are shown in Table 11.

TABLE 11

| | Properties of Ex. 1 to 5 after EB cure | | | | |
| --- | --- | --- | --- | --- | --- |
| | Ex. 1 White | Ex. 2 Magenta | Ex. 3 Cyan | Ex. 4 Yellow | Ex. 5 Black |
| Surface Cure (Nail Scratch) | Excellent | Excellent | Excellent | Excellent | Excellent |
| Surface Cure (Specac) | Excellent | Excellent | Excellent | Excellent | Excellent |
| IPA Rubs | 90+ | 75+ | 80+ | 80+ | 60+ |
| Tape adhesion (600 Tape) | 100% | 100% | 100% | 100% | 100% |
| Density | 67.8 (opacity) | 1.38 | 1.51 | 1.10 | 1.47 |

The results in Table 11 show that the inventive inks Ex. 1 to 5 exhibit excellent properties after curing with EB.

Example 13. Set-Off Migration Testing of Process Inks

Example 2 Magenta ink and Example 3 Cyan ink were evaluated using a set-off migration test. The reverse side (what would be the inside of the package in contact with the product) of a blank Tetrapak board substrate was placed in contact with the printed side of the test prints, and pressed at 10 tons over 48 hours. Tetrapak board is a paperboard substrate, with one side (the outside) coated with polyethylene, and the other side (the inside) coated with polyethylene and aluminum layers. A 100 cm² sample was cut from the Tetrapak board, and placed into a migration testing cell. The cells were filled with 100 ml of ethanol, sealed, and stored over 24 hours at room temperature. After the 24 hour exposure period the ethanol was removed from the cells, concentrated to 1 ml, and the resulting concentrate analysed by GC-MS and HPLC-MS for the presence of unreacted monomers and photoinitiator residue. The analytes were present in the ethanol in a concentration of about 10-12 ppb, or less. The results indicate that the cured ink and coating compositions of the invention do not contain a significant amount of migratable materials, and are suitable for sensitive packaging such as food packaging.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. An energy curable ink or coating composition, comprising:
   a) a polymerizable compound, wherein the polymerizable compound comprises:
      i. one or more polymerizable ethylenically unsaturated monomers and/or oligomers;
      ii. wherein 2 wt % to 40 wt % is 3-methyl-1,5-pentanediol diacrylate, based on the total weight of the polymerizable monomers and/or oligomers;
   b) 8 wt % to 16 wt % one or more photoinitiators, based on the total weight of the ink or coating composition; and
   c) 8 wt % to 24 wt % one or more colorants, based on the total weight of the ink or coating composition; and
   d) 0.1 wt % to 5 wt % of an optical brightening agent, based on the total weight of the ink or coating composition, wherein the optical brightening agent is a UV sensitizer;

wherein the ink or coating composition comprises less than 2 wt % organic solvent, based on the total weight of the ink or coating composition; and wherein the ink or coating composition is curable by UV-LED radiation.

2. The energy curable ink or coating composition of claim 1, wherein the optical brightening agent is a fluorescent brightening agent.

3. The energy curable ink or coating composition of claim 1, wherein the polymerizable compound comprises at least one ethoxylated oligomer.

4. The energy curable ink or coating composition of claim 1, further comprising an oxygen inhibitor.

5. The energy curable ink or coating composition of claim 4, wherein the oxygen inhibitor is aminated ethoxylated trimethylolpropane triacrylate.

6. The energy curable ink or coating composition of claim 1, wherein at least one photoinitiator is selected from the group consisting of alkyl amino acetophenone, polymeric thioxanthone, phosphine oxide, and combinations thereof.

7. The energy curable ink or coating composition of claim 1, wherein the ink or coating composition is a flexographic, lithographic, gravure, digital, inkjet, offset, screen, or letterpress ink.

8. A method of producing a printed article, comprising the steps of:
   a) applying the energy curable ink or coating composition of claim 1 on a substrate; and
   b) curing the energy curable ink or coating composition on the substrate.

9. The method of claim 8, wherein curing in step b) is accomplished using UV light.

10. The method of claim 9, wherein the UV light is UV-LED light.

11. The method of claim 8, wherein curing in step b) is accomplished by using electron beam radiation.

12. A printed article comprising the energy curable ink or coating composition of claim 1.

* * * * *